Figure 1:
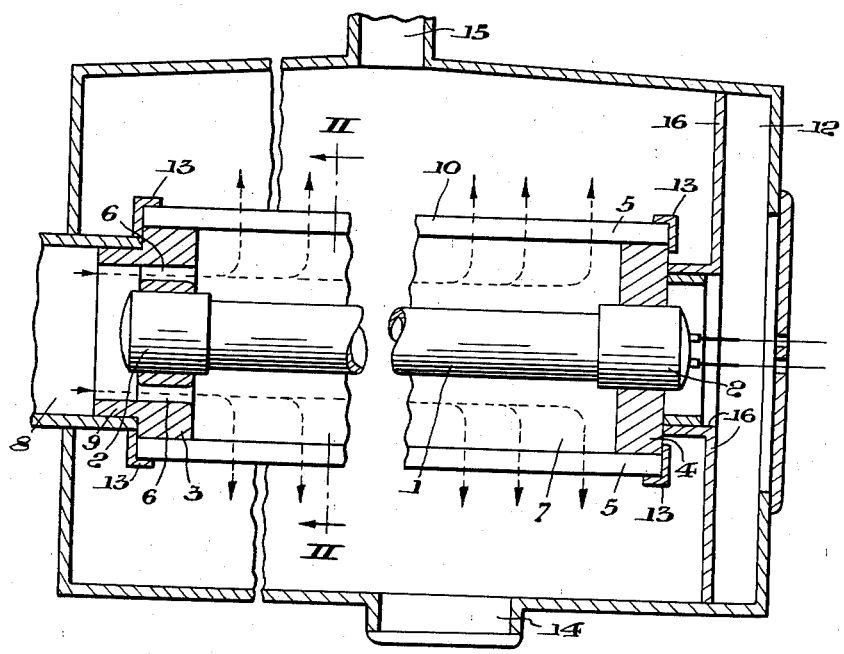

Jan. 17, 1961  A. HÄBERLE ET AL  2,968,719
APPARATUS FOR REMOVAL OF NITRIC OXIDE FROM GASES
Filed Jan. 24, 1958

INVENTORS.
ALBERT HÄBERLE, and
GÜNTER HACKSTEIN.
BY Thomas J. P. O'Brien
their
ATTORNEY.

United States Patent Office 2,968,719
Patented Jan. 17, 1961

2,968,719

APPARATUS FOR REMOVAL OF NITRIC OXIDE FROM GASES

Albert Häberle, Essen-Werden, and Günter Hackstein, Essen, Germany, assignors, by mesne assignments, to Koppers Company, Inc., Pittsburgh, Pa., a corporation of Delaware Filed Jan. 24, 1958, Ser. No. 710,901

3 Claims. (Cl. 250—43)

The present invention relates to an improved apparatus for chemical treatment of gases, and more especially for removal of nitric oxide from gases containing it, for example coal distillation gases, by irradiating the gases with ultraviolet rays which are produced in a known burner, such as quartz burner, arranged in the gas stream, and the object of the invention is the provision for this purpose of an improved apparatus which incorporates means whereby the life of operation may be considerably prolonged, by eliminating downtime for cleaning the burner due to deposits on the same of constituents from the gas, which are not transparent to the passage of the ultraviolet rays of the burner.

It is known that gases can be irradiated with ultraviolet rays in order to produce certain chemical changes in the gas, for example formation of ozone. Gases have also been irradiated with ultraviolet rays to make the gases more or less free from germs.

It has recently been suggested to irradiate technical gases which contain nitric oxide with ultraviolet light in order to convert the nitric oxide to nitrogen dioxide which can be removed comparatively easily from the gas by means of a known washing process. In comparison with nitrogen dioxide, nitric oxide can not be practically removed by a washing process. However, if the nitric oxide remains in the gas, especially in city gas used for supplying homes, an extremely serious difficulty occurs because the nitric oxide only slowly forms resinous substances with other constituents of the gas during the conveyance of the gas, and these resinous substances are deposited especially in the regulating means of the gas line and in time cause hard incrustations which make the regulating means inoperable, as indicated, for instance in Shively U.S. Patent 2,195,431 of April 2, 1940. Therefore, endeavors are made to remove the nitric oxide from the gas in the form of $NO_2$ by treating the gas with ultraviolet rays to accelerate the conversion in the gas of nitric oxide to nitrogen dioxide, which is then washed from the gas before it is pumped into the distributing lines.

When the nitric oxide is converted to nitrogen dioxide by means of an ultraviolet irradiator burner arranged in the gas stream, the initially good efficiency of this irradiation drops to practically zero after a short time. The reason for this phenomenon resides in the fact that there is formed on the outer surface of the ultraviolet irradiator burner a substantial coating of cracked products deposited from the gas which are formed as a result of contact of certain constituents of the gas, especially its hydrocarbon content, with the hot burner and in time this coating prevents the passage of the rays into the gas stream. This coating can again be removed with the aid of chemical means, but it is necessary for this purpose to take the radiation apparatus out of operation and in some cases to dismantle it. A serious operating disturbance results thereby.

The above-cited difficulty is overcome according to the invention by enclosing a preferably rectilinear, conventional tubular burner known to irradiate ultraviolet rays in a jacket transparent to ultraviolet rays, which jacket is provided with numerous passages through which a protective gas can flow outwardly into the gas stream at a velocity of flow such that the gas to be irradiated can not come in contact, in substantial amount, with either the outside of the jacket or with the outside of the burner. A protective gas for this purpose, coke oven gas or city gas, which have been purified to such extent that it contains practically only an insignificant amount of benzol and other benzol hydrocarbons, is used. Instead of pure coke oven gas, the invention contemplates the use of any other gas, such as hydrogen, nitrogen, or slightly superheated steam, which contains no decomposable constituents.

An embodiment of apparatus according to the invention is illustrated in simplified form in the drawing.

Figure 2:
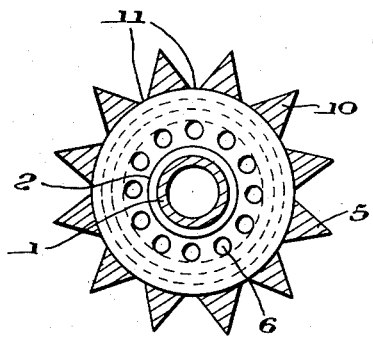

Fig. 1 is a longitudinal section, and
Fig. 2 is a cross-section through the same along line II—II of Fig. 1.

A known type of ultraviolet burner 1 is located inside a gas line or chamber 12 through which the gas to be irradiated containing nitric oxide flows at a certain velocity. The supporting means 16 by which the burner is fastened in the gas line are not illustrated in greater detail.

Disks 3 and 4, which form the end surfaces of a cylindrical intermediate space 7 surrounding the burner 1 are placed on the heads 2 of the burner 1. The jacket 10 of the cylindrical intermediate space 7 consists of transparent rods 5 which are preferably triangular in cross-section. These rods are arranged in spaced relation parallel to one another side by side in an annular series so that they rest by a triangular surface thereof on disks 3 and 4 and are fastened thereon, for example by weldments 13. The annular intermediate space 7 between the burner 1 and jacket 10 is connected with the outer space in the gas chamber 12 by the slit spaces 11 left free between the rods for throughflow of gas. The rods 5 are made of material transparent to ultraviolet rays, for example quartz glass or the like, so that they do not substantially weaken the ultraviolet rays from the burner 1. The terminal metal disk 3 is provided with openings 6 through which the protective gas can be introduced under pressure higher than the pressure in chamber 12, into the annular intermediate space 7 between the protective jacket 10 and the burner 1. The protective gas is supplied to the openings 6 through a pipeline 8 which overlaps a tubular connecting extension 9 of disk 3. The protective gas which is supplied through openings 3 into protective space 7 flows at a comparatively high velocity, relative to the flow of gas in chamber 12, outwardly through the narrow slits 11 between rods 5, and produces around the jacket streams of gas which are so strong that the gas to be irradiated in chamber 12 does not come in contact with the burner 1 or even with the rods 5 of the jacket 10. Decomposition of certain constituents of the gas to be irradiated with formation of precipitates therefrom on the rods 5 or burner 1, which are not transparent to ultraviolet rays of burner 1, is thereby avoided.

In operation, the burner 1 in association with the jacket 10 and protective gas supply means 8 and 6, is enclosed in the gas chamber 2, in the path of flow of gas to be irradiated between the gas inlet 14 and the gas outlet 15, and the gas from the outlet 15 is subsequently washed to remove the further oxide formed from the NO as a result of the action of the ultraviolet ray thereon.

In general, the process is conducted as described in the aforesaid Shively et al. patent, which is hereby made a part hereof, but with the novel burner structure and acts thereof in the Shively et al. apparatus in lieu of the electrode structure described in said Patent 2,195,431.

The invention as herein-above set forth is embodied in particular form and manner but may be variously embodied within the scope of the claim hereinafter made.

We claim:

1. In apparatus for chemical treatment of gases, which comprises: a gas treating chamber with gas inlet means for inflow of gas to be treated, and gas outlet means for outflow of treated gas therefrom, and an ultraviolet ray burner arranged in the gas treating chamber in the path of flow of gas between the gas inlet and the gas outlet, the improvement comprising: a jacket in spaced surrounding relation with the burner, which jacket is transparent to ultraviolet rays and is provided with numerous passages through which a protective gas may flow outwardly from the space between the burner and jacket at a velocity to prevent the gas that is to be irradiated from coming into contact with the outside of the jacket and with the outside of the burner during its flow past the burner, and means for introducing a flow of protective gas into the space between the jacket and the burner, said protective jacket comprising parallel, triangular rods which are transparent to ultraviolet rays and which are arranged in an annular series around the burner, with an apex of each of said rods pointed radially outward and the oppositely disposed base surface thereof spaced from the base surface of the next adjacent rod in the series thereof so as to leave a comparatively small slit therebetween through which the protective gas may flow outwardly from the space between the burner and the jacket.

2. Apparatus as claimed in claim 1, and in which the burner is a quartz burner, the rods rest on disks on oppositely disposed ends of the burner, to keep the rods clear of the burner, and one of the disks is provided with openings for the aforesaid introducing of protective gas into the space between the jacket and the burner.

3. Apparatus as claimed in claim 2, and in which the rods are constituted of quartz glass.

References Cited in the file of this patent

UNITED STATES PATENTS

| | | |
|---|---|---|
| 2,075,895 | Harmon | Apr. 6, 1937 |
| 2,195,431 | Shively et al. | Apr. 2, 1940 |
| 2,298,124 | Hartman | Oct. 6, 1942 |

FOREIGN PATENTS

| | | |
|---|---|---|
| 65,761 | Denmark | Oct. 20, 1947 |
| 903,265 | Germany | Feb. 4, 1954 |